Feb. 3, 1959 L. D. SMITH 2,872,647

MICROWAVE SINGLE-SIDEBAND MODULATOR

Filed June 13, 1955

INVENTOR
Lee D. Smith
BY W. E. Thibodeau, A. W. Dew and J. D. Edgerton
ATTORNEYS

1

2,872,647

MICROWAVE SINGLE-SIDEBAND MODULATOR

Lee D. Smith, Silver Spring, Md., assignor to the United States of America as represented by the Secretary of the Army Application June 13, 1955, Serial No. 515,267

1 Claim. (Cl. 332—45)

(Granted under Title 35, U. S. Code (1952), sec. 266)

The invention described herein may be manufactured and used by or for the Government for governmental purposes without the payment to me of any royalty thereon.

This invention relates to microwave modulators and more particularly to a modulator for producing one or more output signals each output signal consisting substantially of a single sideband.

My invention provides a practical device, not previously known, for generating single sideband signals at microwave frequencies. My invention has utility for laboratory, communications, and other microwave applications. For one thing, the invention provides convenient means for generating second and third microwave signals differing in frequency from each other and from a first microwave signal by amounts that are known to the precision with which the frequency of a nonmicrowave modulating signal is known, even though the frequency of the first microwave signal may vary or may not be precisely known.

Briefly, preferred forms of my invention entail injecting a microwave carrier signal of frequency $f_c$ into the H arm or E arm of a hybrid T or other form of hybrid junction having equivalent electrical characteristics. A crystal diode is mounted in each side arm of the T. A reflecting backplate, preferably adjustable as to position, is mounted at the end of each side arm, behind each diode. The injected carrier divides between the two side arms. Modulating signals of frequency $f_m$ are applied to the diodes. The effective reflection of the carrier signal incident at each diode depends upon the instantaneous value of the voltage across the diode. Upper and lower sideband components having frequencies $f_c \pm f_m$, $f_c \pm 2f_m$, . . . $f_c \pm nf_m$ are reflected to the junction. By appropriate selection and adjustment of diode-to-junction distance, of backplate-to-diode distance, of static bias voltage applied to the diodes, and of the amplitudes and phase relations of the modulating signals applied to the two diodes, certain sideband components generated at each of the diodes are caused to arrive at the junction in phase and to couple to the H arm, while other components are caused to arrive at the junction substantially 180 degrees out of phase and to couple to the E arm.

An object of my invention is to provide a practical generator of single-sideband signals at microwave frequencies.

Another object is to provide a device adapted to receive a microwave input signal and to produce at least one microwave output signal differing in frequency from the input signal by a desired amount.

Other objects, aspects, uses, and advantages of the invention will become apparent from the following description and from the accompanying drawing, in which—

2

Figures 1, 3:
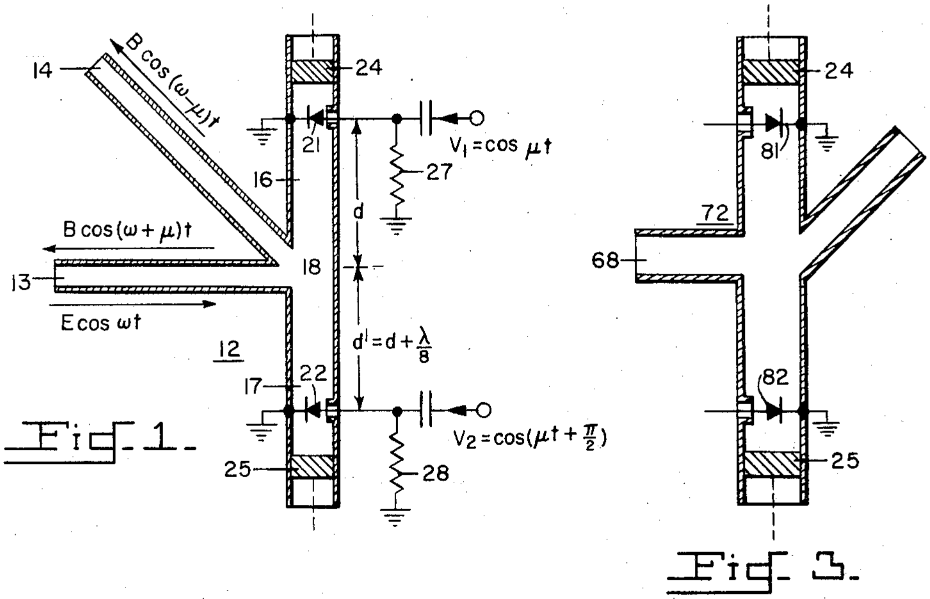
Fig. 1 is a schematic diagram of one form of single-sideband modulator in accordance with my invention.
Figure 2:
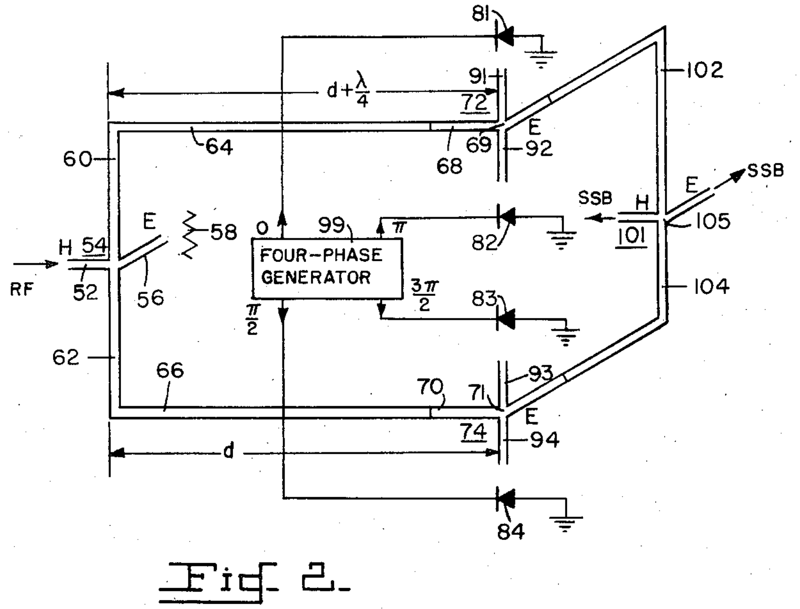
Fig. 2 is a schematic of another form of single-sideband modulator in accordance with my invention.

Fig. 3 is a detail of one of the two modulator T's shown in Fig. 2.

In Fig. 1, a hybrid T 12 has an H arm 13, an E arm 14, and two side arms 16 and 17. A microwave carrier signal of amplitude $E \cos \omega t$ is injected into H arm 13. A first crystal diode 21 is mounted in side arm 16 at a distance $d$ from junction 18 of T 12. A second crystal diode 22 is mounted in side arm 17 at a distance $d'$ from junction 18; $d'$ differs from $d$ by one-eighth wavelength. A backplate 24 is located at an adjustable distance behind diode 21, and another backplate 25 is located at an adjustable distance behind diode 22. Each of these distances is of the order of one-fourth wavelength. One terminal of each of diodes 21 and 22 is grounded to the body of T 12. Means are provided for applying a modulation voltage $v_1 = \cos \mu t$ to the other terminal of diode 21 and for applying a voltage $$v_2 = \cos\left(\mu t + \frac{\pi}{2}\right)$$

to the other terminal of diode 22. Bias resistors 27 and 28 or other means are provided for maintaining a D.-C. bias on diodes 21 and 22.

The microwave signal $E \cos \omega t$ injected into H arm 13 divides between side arms 16 and 17.

The amplitudes of the microwave signals reflected back to junction 18 are functions of the voltages applied to diodes 21 and 22, as well as of the distances of the diodes from the backplates. It will be understood that the wave at junction 18 due to reflection from diode 21 will include a first upper sideband component of the form $$e_a = B_a \cos\left[(\omega+\mu)t - \frac{\omega d}{c}\right]$$

and a first lower sideband component of the form $$e_a' = B_a \cos\left[(\omega-\mu)t - \frac{\omega d}{c}\right]$$

where $B_a$ is a reflection coefficient. Similarly, the wave at junction 18 due to reflection from diode 22 will include a first upper sideband component of the form $$e_b = B_b \cos\left[(\omega+\mu)t - \frac{\omega}{c}\left(d + \frac{\lambda}{4}\right) + \frac{\pi}{2}\right]$$

$$= B_b \cos\left[(\omega+\mu)t - \frac{\omega d}{c} - \frac{\pi}{2} + \frac{\pi}{2}\right]$$

$$= B_b \cos\left[(\omega+\mu)t - \frac{\omega d}{c}\right]$$

and a first lower sideband component of the form $$e_b' = B_b \cos\left[(\omega-\mu)t - \frac{\omega d}{c} - \frac{\pi}{2} - \frac{\pi}{2}\right]$$

$$= B_b \cos\left[(\omega-\mu)t - \frac{\omega d}{c} - \pi\right]$$

The first upper sideband components received at junction 18 from backplates 24 and 25 are thus in phase and couple to the H arm 13, while the first lower sideband components differ in phase by $\pi$ radians and couple to the E arm 14.

It will be understood that higher order sideband components may also be produced by the modulation of the input wave by diodes 21 and 22. It can be shown that even-order sideband components, upper and lower alike, divide equally between the H and E arms 13 and 14; while odd-order upper sideband components couple to the H arm 13 and odd-order lower sideband components couple to the E arm 14. In general, third- and higher-order sideband components are of negligible amplitude.

If carrier-frequency energy is reflected from diodes 21 and 22 to junction 18, such energy may enter E arm 14 along with the lower sideband. However, it is practical to suppress the carrier in the E arm by suitable adjustment of the position of each backplate 24 and 25 or of the static bias on diodes 21 and 22, so that negligible energy is reflected at the carrier frequency or so that such energy as is reflected is properly phased to couple to the H arm. It will be apparent that appropriate static bias can readily be provided in several ways. In Fig. 1 such bias is developed across resistors 27 and 28 by rectification of the microwave and/or modulation-frequency signals reaching diodes 21 and 22.

Efficiency of a modulator may be defined as the ratio of input carrier power to the power delivered at the desired frequency. Suppression may be defined as the ratio of the power delivered at the desired frequency to the power in the unwanted component of highest amplitude. In modulators constructed in accordance with Fig. 1, I have obtained suppressions of between 10 and 22 decibels and efficiencies of between 9 and 17 decibels. Low amplitudes of carrier and modulation signals tend to give best suppression but poorest efficiency.

Fig. 2 shows another single-sideband modulator in accordance with the invention. In the arrangement shown in Fig. 2 two signals each containing both upper and lower sidebands are generated. However, the upper (or lower) sidebands in these two signals are substantially in phase, while the lower (or upper) sidebands in the two signals are substantially 180 degrees out of phase. These two signals are combined in a suitable phase-sensitive device that provides two separate outputs, one consisting of the upper sideband and the other consisting of the lower sideband.

In Fig. 2, a microwave input signal is applied to the H arm 52 of a first symmetrical hybrid T 54 the E arm 56 of which is provided with a matched termination 58. Side arms 60 and 62 of the T 54 feed waveguide sections 64 and 66 respectively which in turn feed H arms 68 and 70 respectively of a second hybrid T 72 and a third hybrid T 74. The combined length of section 64 and arm 68 exceeds the combined length of section 66 and arm 70 by one-fourth wavelength at the microwave input frequency, so that the microwave signal reaching T 72 lags that reaching T 74 by $\pi/2$ radians.

Crystal diodes 81 and 82 are mounted near the ends of the side arms of T 72. Fig. 3 shows the arrangement in detail. Similar diodes 83 and 84 are similarly mounted near the ends of T 74. Both T's 72 and 74 are symmetrical.

A four-phase generator 99 supplies a modulation-frequency signal to each of the four diodes 81, 82, 83 and 84. The relative phases of the signals applied to each of the diodes are 0, $\pi/2$, $\pi$, and $3\pi/2$, respectively. It can be shown both theoretically and empirically that, in each of T's 72 and 74, the carrier and even-order sideband components are in phase at the junction and couple back into the H arm, while the odd-order components differ at the junction by $\pi$ radians and couple into the E arm. These even-order sideband components from H arms 68 and 70 of T's 72 and 74 are dissipated in terminating resistor 58 at the end of E arm 56 of input T 54.

It may be desirable to maximize the ratio of power in the first sideband pair to total power in the E arm. This can be done conveniently, for each of T's 72 and 74, by adjusting the position of the backplates in each of T's 72 and 74 until the amplitudes of the carrier and of the second sideband pair become equal.

The E arm outputs of T's 72 and 74, each output consisting of both upper and lower odd-order sideband components, are connected to side arms 102 and 104 of a fourth hybrid T 101. The effective distances of junctions 69 and 71 of T's 72 and 74 from junction 105 of T 101 are equal or differ by an integral number of wavelengths.

Consideration of what has been said above will show that, because of the phase relations of the microwave and modulation signals applied to T's 72 and 74, the upper sideband components reaching junction 105 from T's 72 and 74 will be in phase, but the lower sideband components will differ in phase by $\pi$ radians. It will be understood that the upper sideband components will couple to the H arm of T 101, while the lower sideband components will couple to the E arm. Since even-order sideband components have been suppressed by the action of T's 72 and 74, and since the third order and higher order sidebands are of low amplitude, the outputs of the H and E arms of T 101 consist essentially of the first upper and first lower sideband components respectively.

In embodiments of the invention of the form shown in Fig. 2, I have obtained efficiencies of from 12 to 14 decibels with more than 20 decibels suppression of total energy of unwanted frequencies.

It will be apparent that the embodiments shown are only exemplary and that various modifications can be made in construction and arrangement within the scope of the invention as defined in the appended claim.

I claim:

An improved microwave single-sideband device having a suppressed carrier output, said device comprising in combination: a hybrid T having an H arm, an E arm, and first and second side arms, all of said arms being joined at a junction, said H arm serving as an input and said E arm serving as an output; means for injecting a carrier microwave signal of frequency $f_c$ into said H arm; first and second adjustable reflector backplates at the ends of said side arms; first and second crystal diodes mounted in said side arms between said backplates and said junction, the effective reflection of waves moving from said junction toward said ends being dependent upon the voltages applied to said diodes, the respective distances of said diodes from said junction differing by substantially one-eighth wavelength at said carrier signal frequency $f_c$; adjustable bias means applied to said diodes; and means for applying modulating signals of frequency $f_m$ to said diodes, said modulating signals differing in phase by 90 degrees; said adjustable backplates and said adjustable bias means being adjusted to suppress said carrier microwave signal from appearing in said E arm, said output E arm thereby containing substantially only the lower sideband signal of frequency $f_c - f_m$.

References Cited in the file of this patent

UNITED STATES PATENTS

| | | |
|---|---|---|
| 2,468,166 | Bruck | Apr. 26, 1949 |
| 2,496,521 | Dicke | Feb. 7, 1950 |
| 2,547,378 | Dicke | Apr. 3, 1951 |

FOREIGN PATENTS

| | | |
|---|---|---|
| 682,652 | Great Britain | Nov. 12, 1952 |